United States Patent
Sekine

(10) Patent No.: US 10,384,544 B2
(45) Date of Patent: Aug. 20, 2019

(54) HIGH-VOLTAGE UNIT CASING FOR ON-VEHICLE USE, HIGH-VOLTAGE UNIT, AND VEHICLE

(71) Applicant: TOYOTA JIDOSHA KABUSHIKI KAISHA, Toyota-shi, Aichi-ken (JP)

(72) Inventor: Hiroyuki Sekine, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/923,061

(22) Filed: Mar. 16, 2018

(65) Prior Publication Data
US 2018/0272869 A1    Sep. 27, 2018

(30) Foreign Application Priority Data
Mar. 22, 2017  (JP) ................ 2017-055261

(51) Int. Cl.
*B60L 3/00*   (2019.01)
*B60K 1/04*   (2019.01)
(Continued)

(52) U.S. Cl.
CPC .............. *B60L 3/0007* (2013.01); *B60K 1/04* (2013.01); *B60L 50/66* (2019.02); *B60L 50/71* (2019.02);
(Continued)

(58) Field of Classification Search
CPC .. B60L 3/007; B60L 11/1877; B60L 11/1892; B60L 11/1896; B60L 11/1998; B60L 3/0007; B60L 50/72; B60L 50/66; B60L 50/71; B60L 58/33; B60K 1/04; B60K 2001/0405; B60K 2001/0411;
(Continued)

(56) References Cited

U.S. PATENT DOCUMENTS 5,948,298 A * 9/1999 Ijaz .................... B60L 50/64
                                                219/209
6,094,927 A * 8/2000 Anazawa ........... B60H 1/00278
                                                62/239
(Continued)

FOREIGN PATENT DOCUMENTS

JP   2009-190438   8/2009
JP   2014-76716    4/2014
(Continued)

*Primary Examiner* — John D Walters
(74) *Attorney, Agent, or Firm* — Finnegan, Henderson, Farabow, Garrett & Dunner, LLP

(57) ABSTRACT

A high-voltage unit casing 10 for on-vehicle use to house therein a plurality of devices includes: a first side face 20; a second side face 21 opposed to the first side face; and a connecting portion 22 for structurally connecting the first side face and the second side face to each other. The connecting portion includes a partitioning portion 50 which is fixed to the first side face at a fixing portion and which extends from the fixing portion toward the second side face, the partitioning portion being located at a position separate from an upper surface and a lower surface of the high-voltage unit casing in an inner surface of the first side face. Spaces for placing at least one device included in the plurality of devices are formed on both upper and lower sides, respectively, of the partitioning portion.

6 Claims, 12 Drawing Sheets

(51) Int. Cl.
    *H01M 8/02*     (2016.01)
    *B60L 50/60*     (2019.01)
    *B60L 50/72*     (2019.01)
    *B60L 58/33*     (2019.01)
    *B60L 50/71*     (2019.01)
    *H01M 2/10*     (2006.01)
    *B62D 25/08*     (2006.01)

(52) U.S. Cl.
    CPC ............... *B60L 50/72* (2019.02); *B60L 58/33* (2019.02); *H01M 8/02* (2013.01); *B60K 2001/0411* (2013.01); *B60Y 2306/01* (2013.01); *B60Y 2400/202* (2013.01); *B62D 25/088* (2013.01); *H01M 2/1083* (2013.01); *H01M 2220/20* (2013.01); *H01M 2250/20* (2013.01); *Y02T 10/7005* (2013.01); *Y02T 90/32* (2013.01)

(58) Field of Classification Search
    CPC ............. B60Y 2306/01; B62D 25/088; H01M 2/1072; H01M 2/1083; H01M 8/02; H01M 2220/20; H01M 2250/20

USPC ........................................................ 180/68.5
    See application file for complete search history.

(56)             References Cited

U.S. PATENT DOCUMENTS

| | | | |
|---|---|---|---|
| 8,757,304 B2 * | 6/2014 | Amano | B60K 1/00 180/65.1 |
| 9,216,638 B2 * | 12/2015 | Katayama | B60K 1/04 |
| 9,260,034 B2 * | 2/2016 | Naito | B60L 3/0007 |
| 2014/0110185 A1 | 4/2014 | Naito et al. | |
| 2017/0334310 A1 * | 11/2017 | Yokoyama | B60L 58/26 |

FOREIGN PATENT DOCUMENTS

| | | |
|---|---|---|
| JP | 2014-83875 | 5/2014 |
| JP | 2014-86171 | 5/2014 |

\* cited by examiner

HIGH-VOLTAGE UNIT CASING FOR ON-VEHICLE USE, HIGH-VOLTAGE UNIT, AND VEHICLE

CROSS REFERENCE TO RELATED APPLICATIONS

This application claims priority to Japanese Patent Application No. 2017-055261 filed on Mar. 22, 2017, the entire contents of which are incorporated by reference herein.

BACKGROUND

Field

The present disclosure relates to a high-voltage unit casing for on-vehicle use, a high-voltage unit, and a vehicle.

Related Art

As a fuel cell vehicle with a fuel cell mounted thereon, conventionally, there has been known a vehicle in which the fuel cell, a drive motor and a fuel-cell voltage control unit or other high-voltage devices are placed in a front compartment, as an example (e.g., JP 2014-076716 A). When the high-voltage devices are mounted on a vehicle, generally, a plurality of devices including high-voltage devices are housed in a casing and mounted as a high-voltage unit.

It is required that such high-voltage devices be protected in the casing even when the vehicle receives impact force from external, for example, upon a vehicle collision. As a method of improving durability of the casing against impact force, a conceivable measure may be, for example, to increase the thickness of the casing. However, in an attempt to ensure the durability of the casing against impact force by increasing the thickness of the casing, there arises a need for increasing the thickness of side surfaces of the casing to an extremely large thickness to obtain enough durability against assumable impact force, which would be unfeasible in some cases. Accordingly, there has been a desire for further improvement in techniques for protecting high-voltage devices against impact force in the high-voltage unit casing. This issue, which is to improve the impact resistance performance in high-voltage unit casings, has been heretofore an issue common among vehicles on which high-voltage devices are to be mounted, such as electric vehicles and hybrid vehicles, without limitation to fuel cell vehicles.

SUMMARY

According to one aspect of the disclosure, there is provided a high-voltage unit casing to be mounted on a vehicle, the high-voltage unit casing configured to house a plurality of devices including a high-voltage device. The high-voltage unit casing comprises: a first side face to be placed along a side face of the vehicle; a second side face opposed to the first side face; and a connecting portion fixed to both the first side face and the second side face and configured to structurally connect the first side face and the second side face to each other. The connecting portion includes a partitioning portion which is fixed to the first side face at a fixing portion and which extends from the fixing portion toward the second side face, the fixing portion being located at a position separate from an upper surface and a lower surface of the high-voltage unit casing in an inner surface of the first side face. Spaces for placing at least one device included in the plurality of devices are formed on both upper side and lower side, respectively, of the partitioning portion.

DETAILED DESCRIPTION

Figure 1:
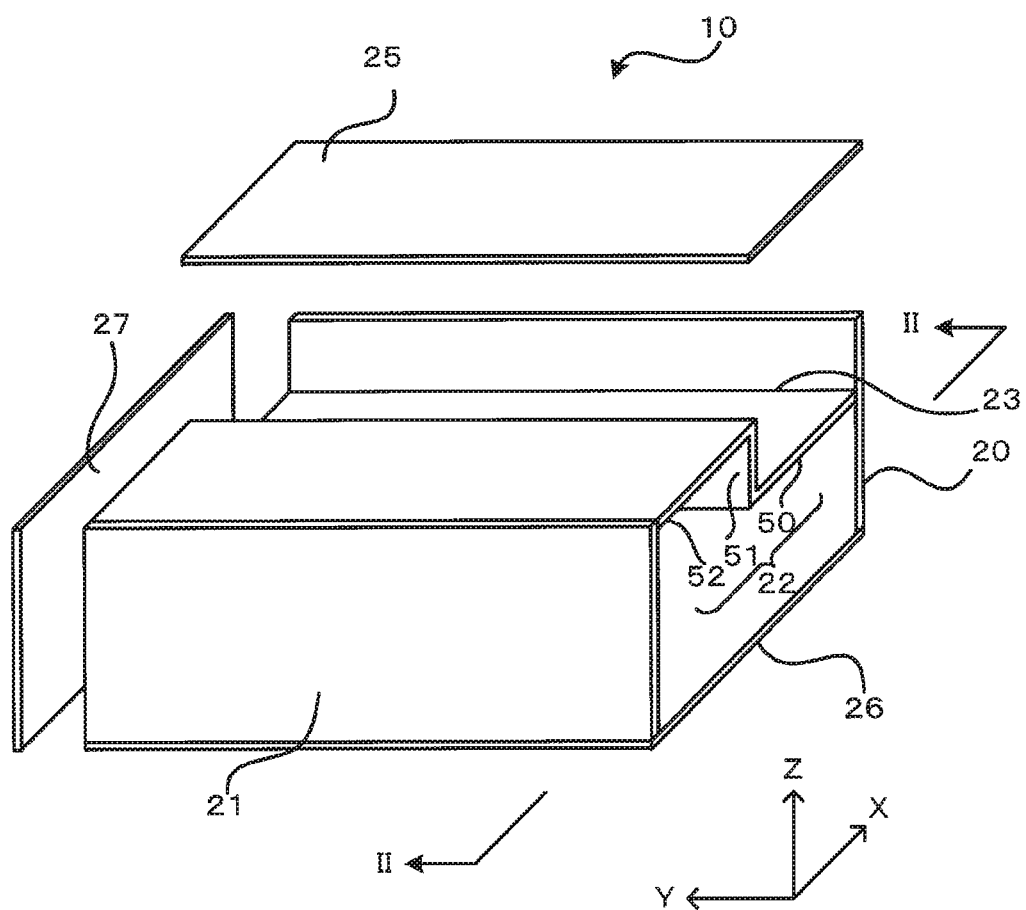
FIG. 1 is an exploded perspective view showing an outline configuration of a high-voltage unit casing.
Figure 2:
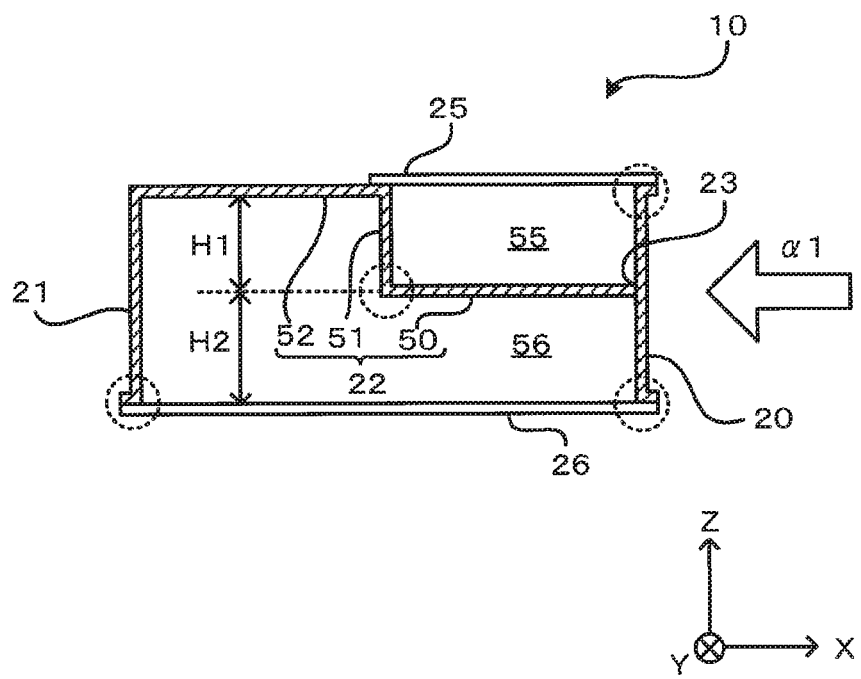
FIG. 2 is a schematic sectional view of a high-voltage unit casing according to a first embodiment.

A. First Embodiment:

FIG. 1 is an exploded perspective view showing an outline configuration of a high-voltage unit casing 10 as a first embodiment of the disclosure. FIG. 2 is a schematic sectional view showing an aspect of a cross section of the high-voltage unit casing 10 that is a cross section taken along the line II-II shown in FIG. 1.

The high-voltage unit casing 10 is a casing which is for on-vehicle use and in which a plurality of on-board devices including high-voltage devices are housed to configure a high-voltage unit. A high-voltage device may be any arbitrary device having electric circuitry and exemplified by a device which is requested that exposure from the casing due to damage to the casing upon a vehicle collision be suppressed from the viewpoint of, for example, safety. Such a request may depend on, for example, regulation by various rules such as legislation. The high-voltage device may be a device having an operating voltage of 60 V DC or more or 30 V AC or more. The operating voltage of the high-voltage device may be 100 V DC or more. Also, the operating voltage of the high-voltage device may be 300 V DC or less. Housing a plurality of devices including such high-voltage devices in the high-voltage unit casing 10 allows a high-voltage unit to be formed.

The high-voltage unit casing 10 may be formed from, for example, aluminum or aluminum alloy. This makes it possible to ensure strength and reduce weight of the high-voltage unit casing. The high-voltage unit casing may also be formed from other kind of metal such as stainless steel.

As shown in FIG. 1, the high-voltage unit casing 10 is generally rectangular parallelepiped-shaped. As shown in FIGS. 1 and 2, the high-voltage unit casing 10 includes a first side face 20, a second side face 21, a connecting portion 22, an upper cover portion 25, a lower cover portion 26, and a third side face 27. In FIG. 2, only the first side face 20, the second side face 21 and the connecting portion 22 are hatched and shown.

In FIGS. 1 and 2, X-Y-Z axes perpendicular to one another are shown. +Z direction is toward a vertical-direction upper side (hereinafter, also referred to simply as upper side), −Z direction is toward a vertical-direction lower side (hereinafter, also referred to simply as lower side). In this embodiment, when a high-voltage unit is mounted on a vehicle, the high-voltage unit is so placed that the upper cover portion 25 and the lower cover portion 26 are set generally parallel to the horizontal direction while the upper cover portion 25 is positioned on the vertical-direction upper side and the lower cover portion 26 is positioned on the vertical-direction lower side.

In this embodiment, when the high-voltage unit is mounted on a vehicle, the high-voltage unit is so placed that +X direction is toward the right side of the vehicle, −X direction is toward the left side of the vehicle, +Y direction is toward the forward side of the vehicle's traveling direction, and −Y direction is toward the rearward side of the vehicle's traveling direction. That is, the X direction refers to 'vehicle's widthwise direction' and 'left/right direction' while the Y direction refers to 'vehicle's front/rear direction.' These directions are also similarly applicable to later-described FIGS. 3 to 8 and FIGS. 10 to 12.

When a high-voltage unit including the high-voltage unit casing 10 is mounted on the vehicle, the first side face 20, the second side face 21, and the third side face 27 are placed along side faces of the vehicle, respectively. The second side face 21 is opposed to the first side face 20. The third side face 27 is perpendicular to the first side face 20 and the second side face 21. Although not shown in FIGS. 1 and 2, a fourth side face opposed to the third side face 27 is provided at an −Y direction end portion in the high-voltage unit casing 10. The first side face 20, the second side face 21, the third side face 27, and the fourth side face correspond to individual side faces, respectively, of the high-voltage unit casing 10 formed into a generally rectangular parallelepiped shape.

In this embodiment, the first side face 20, the second side face 21, the third side face 27, and the fourth side face (hereinafter, referred to also as casing side faces, collectively) are each formed of a single member. Instead, the casing side faces may be each formed of a plurality of members. Also, the casing side faces are formed without having any step gap. On an inner surface of the first side face 20, as described later, is formed a fixing portion 23 at which the connecting portion 22 is fixed. In the inner surface and an outer surface of the first side face 20, upper and lower regions of a position where the fixing portion 23 is formed are formed flush with each other. The flush formation of the first side face 20 makes it allowable that, for example, the inner surface or outer surface of the first side face 20 has recessed-and-protruded shape of structures or the like suited for connection with members that are to be placed inside or outside the first side face 20.

The connecting portion 22 is fixed to both the first side face 20 and the second side face 21 to structurally connect the first side face 20 and the second side face 21 to each other. The connecting portion 22 is fixed to the first side face 20 at the fixing portion 23 which is located at a position separate from an upper surface and a lower surface of the high-voltage unit casing 10 in the inner surface of the first side face 20. The connecting portion 22 includes a partitioning portion 50, a step-gap surface portion 51, and an upper surface portion 52. The partitioning portion 50 is fixed to the first side face 20 at the fixing portion 23, and extends horizontally from the fixing portion 23 toward the second side face 21. The upper surface portion 52 is fixed to an upper end of the second side face 21, and extends horizontally from a site of its fixation to the second side face 21 toward the first side face 20. The step-gap surface portion 51 extends vertically to connect a left-side end portion of the partitioning portion 50 and a right-side end portion of the upper surface portion 52 to each other.

At the fixing portion 23, the connecting portion 22 and the inner surface of the first side face 20 may be fixed together by, for example, welding. Instead, other methods by using bolts and nuts, using rivets, or the like may be used for the fixation.

The connecting portion 22 may also be formed integrally as a whole. For example, the connecting portion 22 may be formed by bending a single plate-shaped member. Otherwise, it is also allowable that the partitioning portion 50, the step-gap surface portion 51 and the upper surface portion 52, after partly formed independently, are integrated together by welding or other means to fabricate the connecting portion 22. Further, the connecting portion 22 may also be formed integrally with the second side face 21.

The upper cover portion 25, which is a horizontally extending plane, is fixed to an upper end portion of the first side face 20 and a right-side end portion of the upper surface portion 52. The upper cover portion 25 and the upper surface portion 52 form an upper surface of the high-voltage unit casing 10.

The lower cover portion 26, which is a horizontally extending plane, is fixed to a lower end portion of the first side face 20 and a lower end portion of the second side face 21. The lower cover portion 26 forms a lower surface of the high-voltage unit casing 10 having a generally rectangular parallelepiped shape.

Inside the high-voltage unit casing 10, spaces for placing at least one device included in the above-described plurality of devices are formed on both upper side and lower side, respectively, of the partitioning portion 50. A space 55 is formed on the upper side of the partitioning portion 50 against the upper cover portion 25, while a space 56 is formed on the lower side of the partitioning portion 50 against the lower cover portion 26. Devices to be placed in the space 55 and the space 56 may be either high-voltage devices or devices other than high-voltage devices. Devices to be placed in the high-voltage unit casing 10 have only to include a high-voltage device.

According to the high-voltage unit casing 10 formed as described above, impact resistance can be enhanced against impact force inputted through and from a side face of the high-voltage unit casing 10. More specifically, the high-voltage unit casing 10 is enabled to enhance its impact resistance against an impact force that is directed toward the first side face 20 fixed to the connecting portion 22 (impact force in the −X direction, i.e., impact force in a direction indicated by hollow arrow α1 in FIG. 2) out of the casing side faces of the high-voltage unit casing 10.

Figure 3:
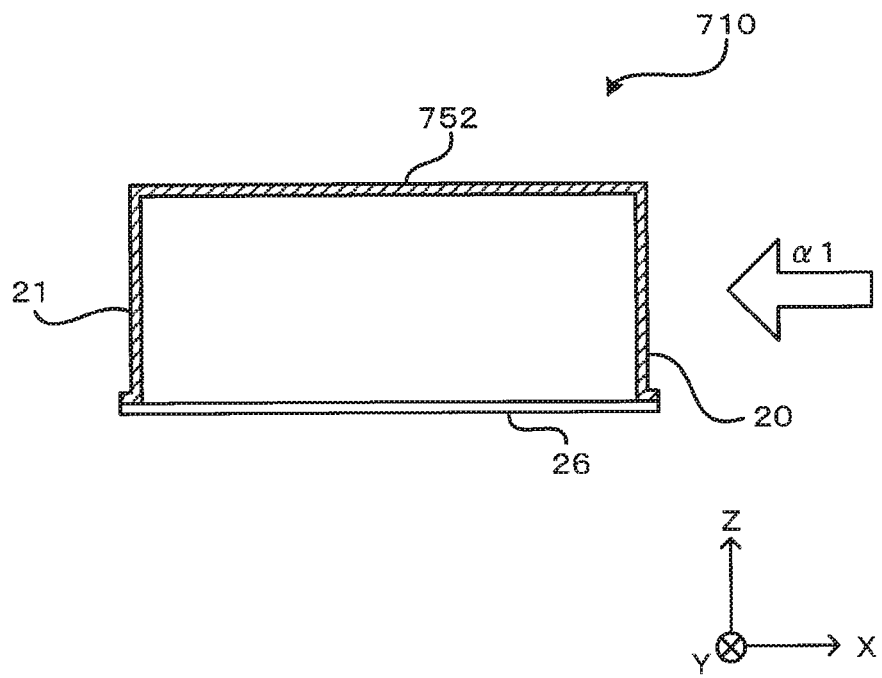
FIG. 3 is a schematic sectional view of a high-voltage unit casing according to a comparative example.

FIG. 3 is a schematic sectional view showing a configuration of a high-voltage unit casing 710 as a comparative example in a cross section similar to FIG. 2. Referring to FIG. 3, like component members corresponding to those of FIG. 2 are designated by like reference signs with their detailed description omitted. The high-voltage unit casing 710 shown in FIG. 3, without having the connecting portion 22 including the partitioning portion 50, has casing side faces including a first side face 20 and a second side face 21, as well as an upper surface portion 752 and a lower cover portion 26. In the high-voltage unit casing 710, when an impact force indicated by hollow arrow α1 is applied to the first side face 20, the impact force works as a bending load for the first side face 20. Therefore, in order to improve the impact resistance performance of the high-voltage unit casing 710, i.e., to suppress exposure of any internal high-voltage device due to damage to the high-voltage unit casing 710, the plate thickness of the first side face 20 may be increased so that flexural rigidity of the first side face 20 is enhanced.

On the other hand, the high-voltage unit casing 10 of this embodiment has the connecting portion 22. Therefore, the impact force shown by hollow arrow α1 can be received not only as a bending load for the first side face 20 extending vertically, but also as a buckling load for the partitioning portion 50 fixed to the first side face 20 and extending horizontally. Furthermore, the connecting portion 22 is fixed to both the first side face 20 and the second side face 21, structurally connecting the two members together, so that the impact force can be transferred to the second side face 21 by the connecting portion 22. As a result, the impact force can be received by the second side face 21 as well as by the first side face 20 that directly receives impact force. Thus, the impact resistance of the high-voltage unit casing 10 as a whole can be enhanced.

Accordingly, since the impact resistance can be enhanced by receiving impact force not only by the first side face 20 but also by the partitioning portion 50 and the second side face 21, the need for thickening the first side face 20 with an aim of ensuring the impact resistance is reduced, allowing the high-voltage unit casing 10 to be kept from increasing in weight.

Also, upon reception of impact force on the first side face 20, the high-voltage unit casing 10 having a generally rectangular parallelepiped shape is enabled to receive the impact force at corner portions of the high-voltage unit casing 10 and moreover to allow the received impact force to partly escape. An example of such corner portions is indicated by circling in broken line in FIG. 2. The high-voltage unit casing 10 of this embodiment includes the connecting portion 22 and has a corner portion formed also between the partitioning portion 50 and the step-gap surface portion 51, allowing impact force to partly escape at this corner portion. Accordingly, the impact resistance performance can be further enhanced.

The fixing portion 23, at which the first side face 20 and the partitioning portion 50 are fixed, is located desirably as close to a vertical center in the first side face 20 as possible, in terms of ensuring the impact resistance. The strength against impact force grows higher and higher as the distance between a position of impact force reception in the first side face 20 and the corner portion being a border of the first side face 20 and the upper cover portion 25 becomes shorter and shorter, and moreover as the distance between the position of impact force reception and a corner portion being a border of the first side face 20 and the lower cover portion 26 becomes shorter and shorter. Thus, it follows that, from the viewpoint of fulfilling the shortening of the above-mentioned two distances at the same time, the fixing portion 23 for reception of impact force from the side face is located desirably as close to the vertical center of the first side face 20 as possible. That is, with respect to a difference between a vertical distance H1 from the fixing portion 23 (partitioning portion 50) to the upper surface of the high-voltage unit casing 10 and a vertical distance H2 from the fixing portion 23 (partitioning portion 50) to the lower surface of the high-voltage unit casing 10, the difference is desirably as small as possible (see FIG. 2).

In addition, for example, the vertical position of the fixing portion 23 may be changed, as required, depending on the size of a device placed in the upper space 55 of the partitioning portion 50 as well as the size of a device placed in the lower space 56. By doing so, the degree of freedom for placement of individual devices in the high-voltage unit casing 10 can be increased. Under conditions that the fixing portion 23 is provided at a position separate from the upper cover portion 25 (upper surface) and lower cover portion 26 (lower surface) of the high-voltage unit casing 10 and that the spaces 55, 56 are formed on the upper and lower sides of the partitioning portion 50, then the above-described effects can be obtained.

Figure 4:
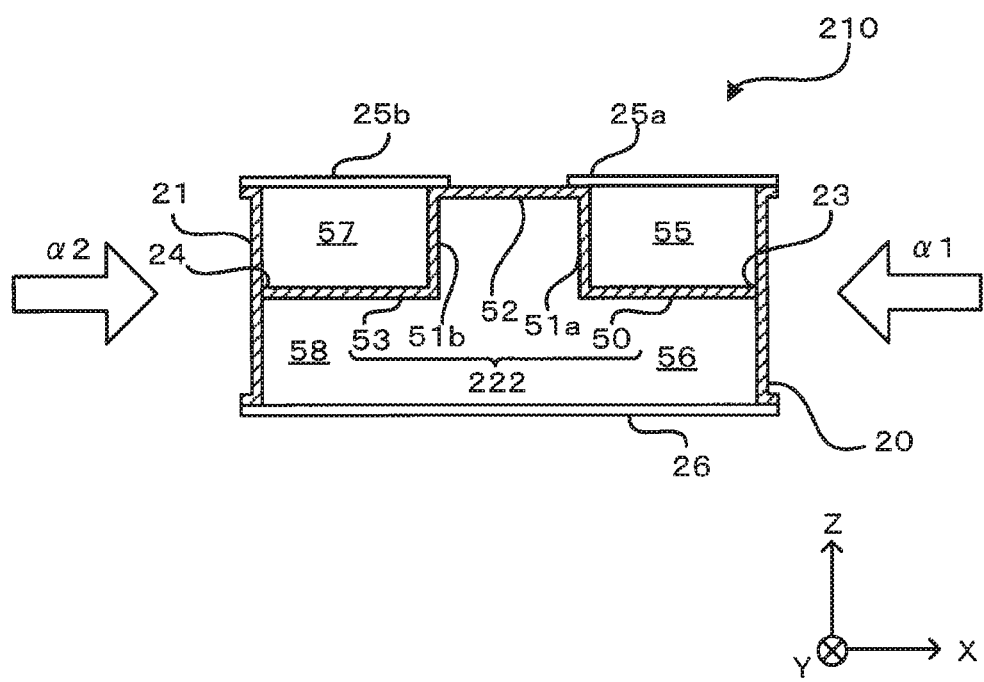
FIG. 4 is a schematic sectional view of a high-voltage unit casing according to a second embodiment.

B. Second Embodiment:

FIG. 4 is a schematic sectional view showing a cross section of a high-voltage unit casing 210 according to a second embodiment, in a way similar to FIG. 2. The high-voltage unit casing 210, like the high-voltage unit casing 10, is a casing which is for on-vehicle use and in which a plurality of on-board devices including high-voltage devices are housed to configure a high-voltage unit. This similarly applies also to high-voltage unit casings of later-described third to sixth embodiments. In the second embodiment, component members common to the first embodiment are designated by like reference signs with their detailed description omitted.

The high-voltage unit casing 210 of the second embodiment is generally rectangular parallelepiped-shaped, and includes a connecting portion 222 instead of the connecting portion 22 as well as upper cover portions 25a, 25b instead of the upper cover portion 25. In FIG. 4, only the first side face 20, the second side face 21 and the connecting portion 222 are hatched and shown.

The connecting portion 222 is fixed to both the first side face 20 and the second side face 21 to structurally connect the first side face 20 and the second side face 21 to each other. The connecting portion 222 is fixed to the first side face 20 at the fixing portion 23 in the inner surface of the first side face 20. The connecting portion 222 is also fixed to the second side face 21 at a fixing portion 24 which is located at a position separate from the upper surface and the lower surface of the high-voltage unit casing 210 in the inner surface of the second side face 21. The connecting portion 222 has partitioning portions 50, 53, step-gap surface portions 51a, 51b, and an upper surface portion 52. The partitioning portion 50 is fixed to the first side face 20 at the fixing portion 23, and extends horizontally from the fixing portion 23 toward the second side face 21. The partitioning portion 53 is fixed to the second side face 21 at the fixing portion 24, and extends horizontally from the fixing portion 24 toward the first side face 20. The upper surface portion 52, which is a plane extending horizontally, is placed between the partitioning portion 50 and the partitioning portion 53 in the X direction to form part of the upper surface of the high-voltage unit casing 210. The step-gap surface portion 51a extends vertically to connect a left-side end portion of the partitioning portion 50 and a right-side end portion of the upper surface portion 52 to each other. The step-gap surface portion 51b extends vertically to connect a right-side end portion of the partitioning portion 53 and a left-side end portion of the upper surface portion 52 to each other.

The fixing portion 24 may be similar in configuration to the fixing portion 23. Also, the connecting portion 222, like the connecting portion 22, may be formed integrally as a whole or may be integrated after formed partly independently.

The upper cover portion 25a, which is a horizontally extending plane, is fixed to an upper end portion of the first side face 20 and a right-side end portion of the upper surface portion 52. The upper cover portion 25b, which is a horizontally extending plane, is fixed to an upper end portion of the second side face 21 and a left-side end portion of the upper surface portion 52. The upper cover portions 25a, 25b and the upper surface portion 52 form the upper surface of the high-voltage unit casing 210.

Inside the high-voltage unit casing 210, spaces 55, 56 for placing at least one device included in the above-described plurality of devices are formed on both upper side and lower side, respectively, of the partitioning portion 50. Spaces 57, 58 are also formed on both upper side and lower side, respectively, of the partitioning portion 53.

According to the high-voltage unit casing 210 formed as described above, as in the first embodiment, impact resistance of the high-voltage unit casing 210 can be enhanced against impact force directed toward the first side face 20 (impact force in the −X direction, i.e., impact force in the direction indicated by hollow arrow α1). Further, according to the second embodiment, the connecting portion 222 is fixed to the second side face 21 at the fixing portion 24 which is located at a position separate from the upper surface and the lower surface of the high-voltage unit casing 210 in the inner surface of the second side face 21. Therefore, the impact resistance of the high-voltage unit casing 210 can be enhanced even against impact force directed toward the second side face 21 (impact force in the +X direction, i.e., impact force in a direction indicated by hollow arrow α2).

Figure 5:
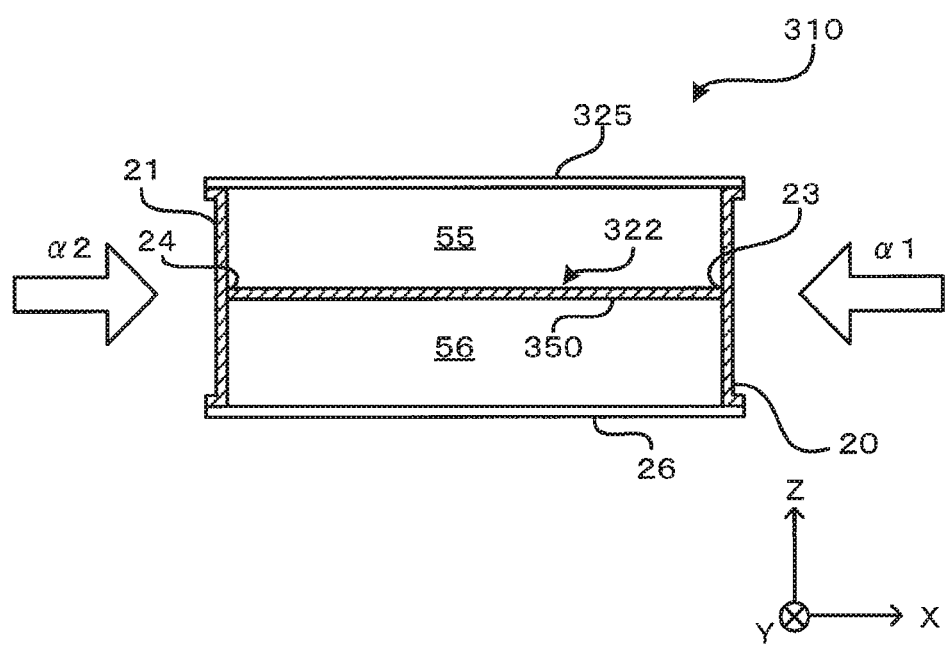
FIG. 5 is a schematic sectional view of a high-voltage unit casing according to a third embodiment.

C. Third Embodiment:

FIG. 5 is a schematic sectional view showing a cross section of a high-voltage unit casing 310 according to a third embodiment, in a way similar to FIG. 2. In the third embodiment, component members common to the first and second embodiments are designated by like reference signs with their detailed description omitted.

The high-voltage unit casing 310 of the third embodiment is generally rectangular parallelepiped-shaped, and includes a connecting portion 322 instead of the connecting portion 22 as well as an upper cover portion 325 instead of the upper cover portion 25. In FIG. 5, only the first side face 20, the second side face 21 and the connecting portion 322 are hatched and shown.

The connecting portion 322 is fixed to both the first side face 20 and the second side face 21 to structurally connect the first side face 20 and the second side face 21 to each other. The connecting portion 322 is fixed to the first side face 20 at the fixing portion 23 in the inner surface of the first side face 20. The connecting portion 322 is also fixed to the second side face 21 at the fixing portion 24 in the inner surface of the second side face 21. The connecting portion 322 is formed entirely by a partitioning portion 350 extending horizontally.

The upper cover portion 325, which is a horizontally extending plane, is fixed to an upper end portion of the first side face 20 and an upper end portion of the second side face 21. The upper cover portion 325 forms the upper surface of the high-voltage unit casing 310.

Inside the high-voltage unit casing 310, spaces 55, 56 for placing at least one device included in the above-described plurality of devices are formed on upper side and lower side, respectively, of the partitioning portion 350.

According to the high-voltage unit casing 310 formed as described above, as in the first embodiment, impact resistance of the high-voltage unit casing 310 can be enhanced against impact force directed toward the first side face 20 (impact force in the +X direction, i.e., impact force in the direction indicated by hollow arrow α1). Further, according to the third embodiment, the connecting portion 322 is fixed to the second side face 21 at the fixing portion 24 in the inner surface of the second side face 21. Therefore, the impact resistance of the high-voltage unit casing 310 can be enhanced even against impact force directed toward the second side face 21 (impact force in the −X direction, i.e., impact force in the direction indicated by hollow arrow α2) as in the second embodiment. Furthermore, in the third embodiment, the connecting portion 322 is entirely formed into a horizontally extending straight shape (shape having no step gaps). Therefore, rigidity of the high-voltage unit casing 310 can be further enhanced against the above-described impact force directed toward the first side face 20 or the second side face 21.

Figure 6:
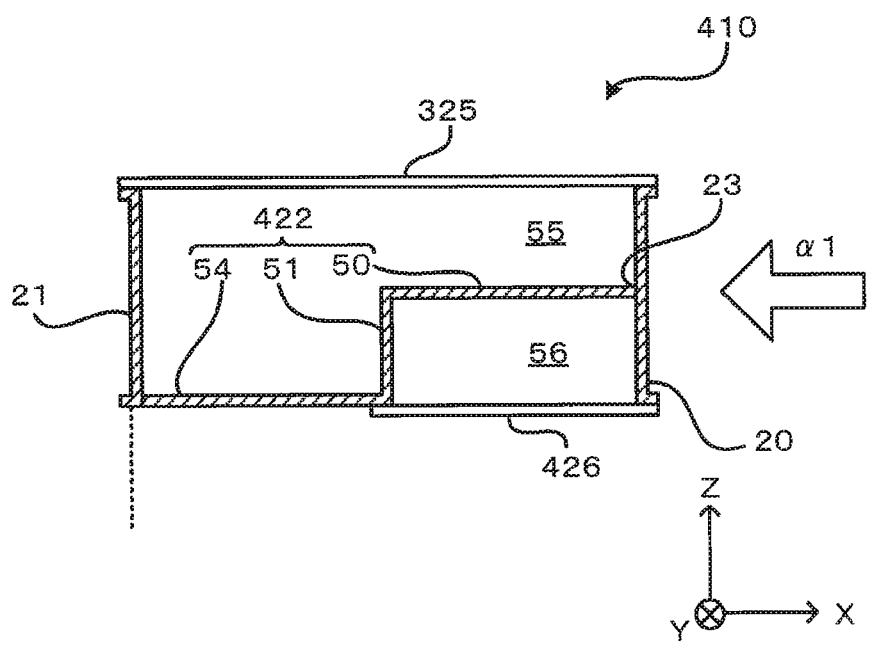
FIG. 6 is a schematic sectional view of a high-voltage unit casing according to a fourth embodiment.

D. Fourth Embodiment:

FIG. 6 is a schematic sectional view showing a cross section of a high-voltage unit casing 410 according to a fourth embodiment, in a way similar to FIG. 2. In the fourth embodiment, component members common to the first to third embodiments are designated by like reference signs with their detailed description omitted.

The high-voltage unit casing 410 of the fourth embodiment is generally rectangular parallelepiped-shaped, and includes a connecting portion 422 instead of the connecting portion 22, an upper cover portion 325 instead of the upper cover portion 25, and a lower cover portion 426 instead of the lower cover portion 26. In FIG. 6, only the first side face 20, the second side face 21 and the connecting portion 422 are hatched and shown.

The connecting portion 422 is fixed to both the first side face 20 and the second side face 21 to structurally connect the first side face 20 and the second side face 21 to each other. The connecting portion 422 is fixed to the first side face 20 at the fixing portion 23 in the inner surface of the first side face 20. The connecting portion 422 has a partitioning portion 50, a step-gap surface portion 51, and a lower surface portion 54. The partitioning portion 50 is fixed to the first side face 20 at the fixing portion 23 and extends horizontally from the fixing portion 23 toward the second side face 21. The lower surface portion 54 is fixed to a lower end of the second side face 21 and extends horizontally from a site of fixation to the second side face 21 toward the first side face 20. The step-gap surface portion 51 extends vertically to connect a left-side end portion of the partitioning portion 50 and a right-side end portion of the lower surface portion 54 to each other.

The lower cover portion 426, which is a horizontally extending plane, is fixed to a lower end portion of the first side face 20 and a right-side end portion of the lower surface portion 54. The lower cover portion 426 and the lower surface portion 54 form the lower surface of the high-voltage unit casing 410.

According to the high-voltage unit casing 410 formed as described above, as in the first embodiment, there can be obtained an effect that impact resistance of the high-voltage unit casing 410 is enhanced against impact force directed toward the first side face 20 (impact force in the −X direction, i.e., impact force in the direction indicated by hollow arrow α1).

Figure 7:
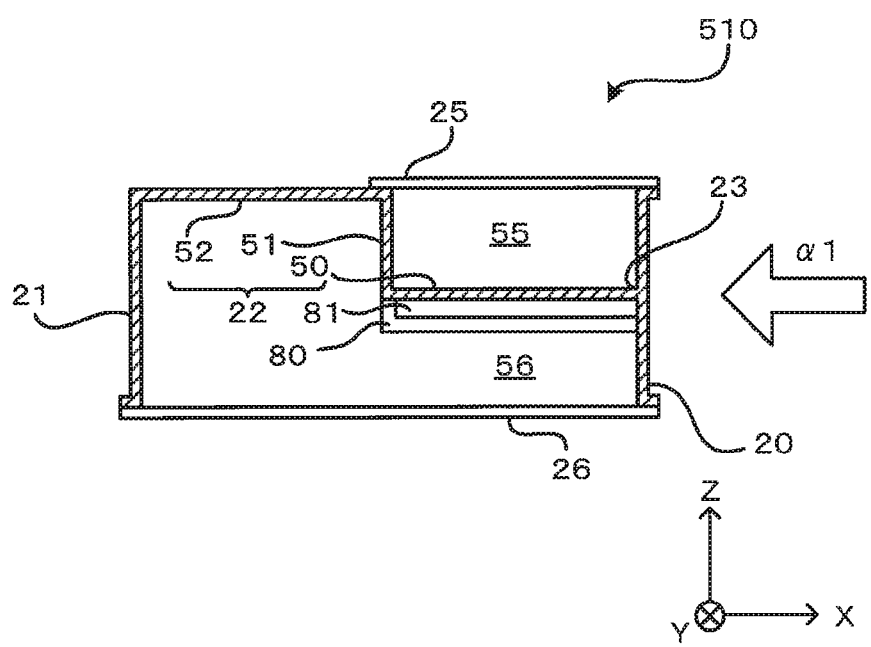
FIG. 7 is a schematic sectional view of a high-voltage unit casing according to a fifth embodiment.

E. Fifth Embodiment:

FIG. 7 is a schematic sectional view showing a cross section of a high-voltage unit casing 510 according to a fifth embodiment, in a way similar to FIG. 2. In the fifth embodiment, component members common to the first to fourth embodiments are designated by like reference signs with their detailed description omitted.

The high-voltage unit casing 510 of the fifth embodiment is generally rectangular parallelepiped-shaped but, unlike the high-voltage unit casing 10, further includes a flow path forming member 80 to be fixed to the connecting portion 22.

In FIG. 7, only the first side face 20, the second side face 21 and the connecting portion 22 are hatched and shown.

The flow path forming member 80 is placed on the lower side of the partitioning portion 50 to form a cooling medium flow path 81 against the partitioning portion 50. The cooling medium flow path 81 functions as a flow path of a cooling medium serving for cooling at least one of devices placed in the space 55 and devices placed in the space 56 out of the above-described devices. That is, the partitioning portion 50 forms part of a wall surface of the flow path of the cooling medium serving for cooling at least one of devices placed on the upper side and devices placed on the lower side of the partitioning portion 50. For cooling of a device placed in the space 55, the device may properly be placed so as to be in contact with the partitioning portion 50. For cooling of a device placed in the space 56, the device may properly be placed so as to be in contact with a horizontally extending plane in the flow path forming member 80.

A device to be cooled by the cooling medium may be a high-voltage device or other than a high-voltage device. The flow path forming member for forming the cooling medium flow path in cooperation with the partitioning portion 50 may be placed on the upper side of the partitioning portion 50 (connecting portion 22).

According to the high-voltage unit casing 510 formed as described above, as in the first embodiment, there can be obtained an effect that impact resistance of the high-voltage unit casing 510 is enhanced against impact force directed toward the first side face 20 (impact force in the −X direction, i.e., impact force in the direction indicated by hollow arrow α1). Further, in the fifth embodiment, the partitioning portion 50 forms part of the wall surface of the flow path of the cooling medium serving for cooling at least one of devices placed in the space 55 and devices placed in the space 56. Therefore, it becomes possible to suppress increases in parts count due to the formation of the cooling medium flow path for cooling of the devices. As a result, it becomes more easily achievable to ensure spaces for placement of the devices in the high-voltage unit casing 510, allowing the high-voltage unit casing 510 to be prevented from upsizing.

Figure 8:
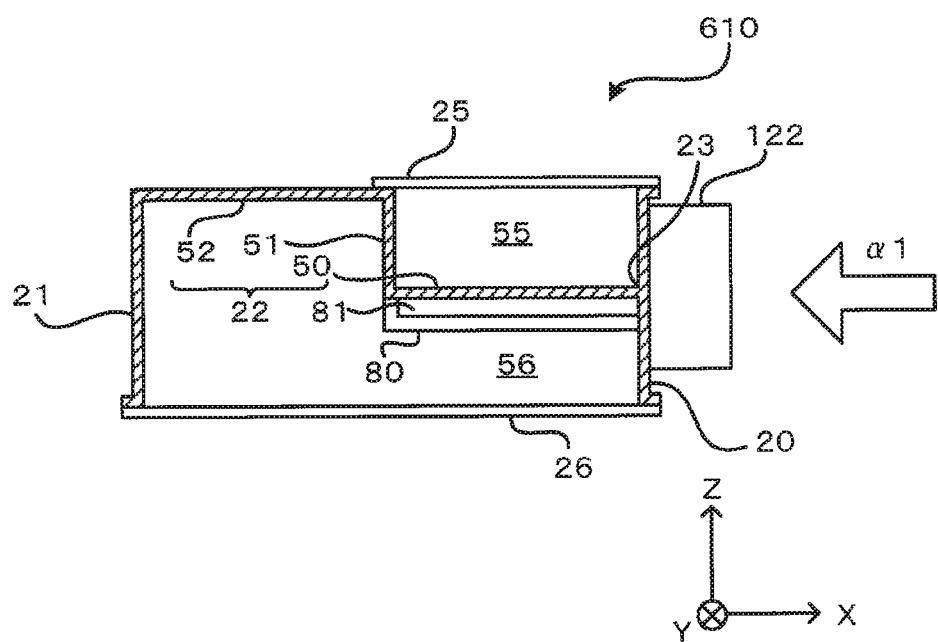
FIG. 8 is a schematic sectional view of a high-voltage unit casing according to a sixth embodiment.

F. Sixth Embodiment:

FIG. 8 is a schematic sectional view showing a cross section of a high-voltage unit casing 610 according to a sixth embodiment, in a way similar to FIG. 2. In the sixth embodiment, component members common to the first to fifth embodiments are designated by like reference signs with their detailed description omitted.

The high-voltage unit casing 610 of the sixth embodiment is similar in configuration to the high-voltage unit casing 510 of the fifth embodiment but, unlike the high-voltage unit casing 510, further includes a protruded portion 122. In FIG. 8, only the first side face 20, the second side face 21 and the connecting portion 22 are hatched and shown.

The high-voltage unit casing 610 is provided with a protruded portion 122 protruded from the outer surface of the first side face 20 in the +X direction. The protruded portion 122 may be formed integrally with the first side face 20 by casting or the like, or those two members may be formed independently of each other and thereafter joined integrally together. The protruded portion 122 is, desirably, formed of, e.g., aluminum or aluminum alloy, like other sites in the high-voltage unit casing 610. This allows strength of the protruded portion 122 to be ensured while increases in weight of the high-voltage unit casing 610 due to the provision of the protruded portion 122 is suppressed. The protruded portion 122 may be formed from a metal material different from those of other sites in the high-voltage unit casing 610. When the protruded portion 122 and the first side face 20 are formed independently of each other, various methods of joining the two members are available such as a method using bolts and nuts, a method using rivets, and welding.

The protruded portion 122 is provided at such a position as to horizontally overlap with the partitioning portion 50. In a case where a vehicle on which the high-voltage unit including the high-voltage unit casing 610 is mounted has received impact force due to a collision or the like, given that the impact force has a +X direction component, the high-voltage unit casing 610 may be moved in the +X direction. In such a case, the protruded portion 122 collides with adjacent another member so that movement of the high-voltage unit can be stopped. Such a collision of the protruded portion 122 with another member causes impact force in the direction indicated by the hollow arrow α1 to be applied to the high-voltage unit casing 610 via the protruded portion 122.

According to the high-voltage unit casing 610 formed as described above, the same effects as in the first embodiment are obtained. Particularly, in this embodiment, the protruded portion 122 is provided at such a position as to horizontally overlap with the partitioning portion 50. Therefore, when the protruded portion 122, which is more likely to receive impact force in the direction indicated by hollow arrow α1, has received such impact force, the impact force can be received securely by not only the first side face 20 but also the connecting portion 22 and the second side face 21. Accordingly, there can be noticeably produced an effect that impact resistance of the high-voltage unit casing 610 is improved.

In addition, even when impact force in the direction indicated by hollow arrow α1 is received at a site where the protruded portion 122 is not provided in the first side face 20, impact resistance can be ensured by the arrangement that the partitioning portion 50 of the connecting portion 22 is fixed to the first side face at the fixing portion 23.

In the sixth embodiment, the protruded portion 122 is further provided in the high-voltage unit casing 510 of the fifth embodiment. However, other configurations may also be adopted. For example, a similar protruded portion 122 may be provided in any one of the high-voltage unit casings of the first to fourth embodiments. Particularly in the high-voltage unit casing 210 of the second embodiment and the high-voltage unit casing 310 of the third embodiment, another protruded portion similar to the protruded portion 122 and protruded in the −X direction may be provided also in the second side face 21. With such a configuration, there can be noticeably obtained an effect that the impact resistance of the high-voltage unit casing is improved for cases in which impact force in the direction indicated by hollow arrow α2 in FIGS. 4 and 5 is received.

Figure 9:
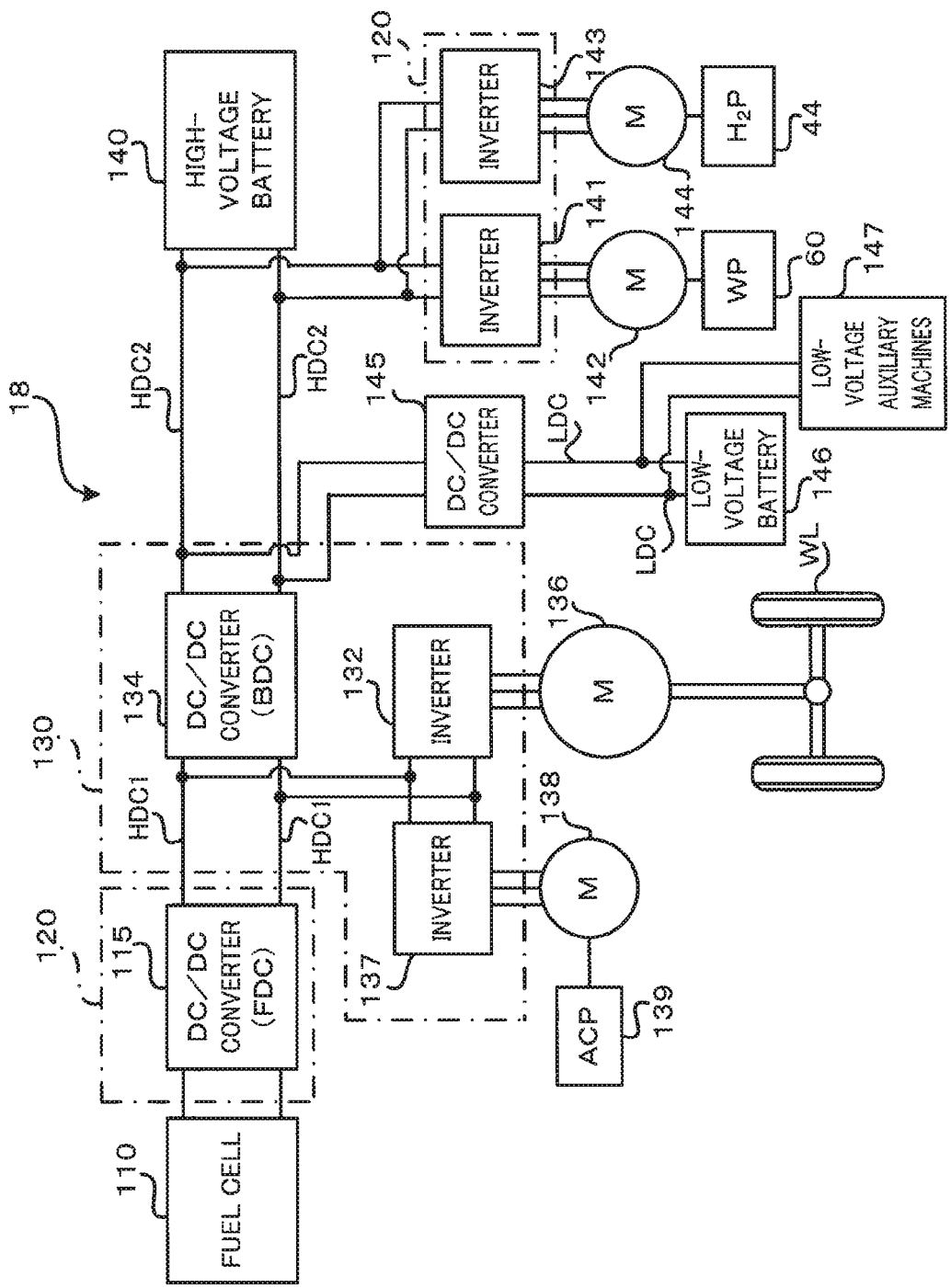
FIG. 9 is an explanatory view showing an outline configuration of a fuel cell vehicle.

G. Seventh Embodiment:

(G-1) General configuration of fuel cell vehicle: FIG. 9 is an explanatory view showing an outline configuration of a fuel cell vehicle 18. The fuel cell vehicle 18 is equipped with a high-voltage unit in which high-voltage devices are housed in a high-voltage unit casing of the above-described embodiments. A general configuration of the whole system to be mounted on the fuel cell vehicle 18 will be described below prior to description of a specific configuration of the high-voltage unit as well as placement of the high-voltage unit in the fuel cell vehicle 18.

The fuel cell vehicle 18 includes a fuel cell 110, a DC/DC converter (hereinafter, also abbreviated as FDC) 115, a high-voltage battery 140, a DC/DC converter (hereinafter, also abbreviated as BDC) 134, a drive motor 136, an air compressor (hereinafter, also abbreviated as ACP) 139, a water pump (hereinafter, also abbreviated as WP) 60, and a hydrogen pump (hereinafter, also abbreviated as $H_2P$) 44. The fuel cell vehicle 18 runs on driving of the drive motor 136 with a drive source given by electric power (electric energy) outputted by the fuel cell 110 and the high-voltage battery 140 as a secondary battery. Also, the air compressor (ACP) 139, the water pump (WP) 60, and the hydrogen pump ($H_2P$) 44 are driven by electric power supplied from at least one of the fuel cell 110 and the high-voltage battery 140. The air compressor (ACP) 139, the water pump (WP) 60, and the hydrogen pump ($H_2P$) 44 are fuel-cell auxiliary machines which operate on power generation of the fuel cell 110 and which configure the fuel cell system together with the fuel cell 110.

The fuel cell 110 has a stack structure in which a plurality of unit cells as a power generator are stacked together. In this embodiment, the fuel cell 110 is provided by a solid polymer type fuel cell, but may be a fuel cell of other types. An output voltage of the fuel cell 110 is changed depending on performance of each unit cell, the number of stacked unit cells, and operating conditions (temperature, humidity, etc.) of the fuel cell 110. In this embodiment, under the condition that the fuel cell 110 is operated for power generation at an operating point at which the power generation efficiency comes to a maximum, the output voltage of the fuel cell 110 is about 240 V.

The fuel cell 110 generates electric power on supply of fuel gas containing hydrogen as well as oxidizing gas containing oxygen. For this purpose, the fuel cell system includes a fuel gas supply section related to supply of fuel gas to the fuel cell 110, and an oxidizing gas supply section related to supply of oxidizing gas to the fuel cell 110.

In the fuel cell system of this embodiment, hydrogen is used as the fuel gas. The fuel gas supply section has, in addition to the above-mentioned hydrogen pump ($H_2P$) 44, a hydrogen tank filled with hydrogen, and various types of valves provided on the flow path of the fuel gas. These members are omitted in the drawings. In the fuel gas supply section of this embodiment, hydrogen discharged from the fuel cell 110 after use for power generation is supplied again to the fuel cell 110, making hydrogen circulated. The hydrogen pump ($H_2P$) 44 is provided on a hydrogen flow path to generate drive force for circulating hydrogen in the flow path, regulating the quantity of fuel gas supplied to the fuel cell 110.

In the fuel cell system of this embodiment, air is used as the oxidizing gas. The above-mentioned air compressor (ACP) 139 included in the oxidizing gas supply section takes in air from outside and compresses the air, then supplying the air to the fuel cell 110 as oxidizing gas.

The fuel cell system of this embodiment also includes a cooling system for cooling the fuel cell 110. The cooling system includes, in addition to the above-mentioned water pump (WP) 60, a radiator (not shown) as an example. In the cooling system, the cooling medium is circulated between the fuel cell 110 and the radiator by the water pump (WP) 60.

The fuel cell 110 is connected to a first high-voltage DC line HDC1 via the DC/DC converter (FDC) 115. The DC/DC converter (FDC) 115 steps up output voltage of the fuel cell 110 to a high voltage available for later-described inverters 132, 137.

The high-voltage battery 140 included in the fuel cell vehicle 18, in this embodiment, functions as auxiliary power for the fuel cell 110. The high-voltage battery 140 may be provided by, for example, a charging/discharging enabled lithium ion battery, or a nickel hydrogen battery. The high-voltage battery 140 stores electric power generated by the fuel cell 110 or electric power regenerated during deceleration of the vehicle. As to the high-voltage battery 140 in this embodiment, an output voltage in a steady state that does not necessarily require charging is about 288 V.

The high-voltage battery 140 is connected to the DC/DC converter (BDC) 134 via a second high-voltage DC line HDC2, and the DC/DC converter (BDC) 134 is connected to the first high-voltage DC line HDC1. The DC/DC converter (BDC) 134 variably regulates voltage level of the first high-voltage DC line HDC1 to change over between charging/discharging state of the high-voltage battery 140. In the discharging state of the high-voltage battery 140, the DC/DC converter (BDC) 134 steps up the output voltage of the high-voltage battery to a high voltage available for the later-described inverters 132, 137. Also in the charging state of the high-voltage battery 140, the DC/DC converter (BDC) 134 steps down the output voltage of the first high-voltage DC line HDC1 to a voltage that allows the high-voltage battery 140 to be charged. As a result, the high-voltage battery 140 is charged with the output power from the fuel cell 110 or the regenerative power of the drive motor 136.

Inverters 132, 137 are connected to the first high-voltage DC line HDC1. In this embodiment, operating voltage of the inverters 132, 137 is about 650 V. The inverter 132 is connected to the drive motor 136, which drives wheels via gears and the like, to function as a driver for the drive motor 136. The drive motor 136 is formed of a synchronous motor having three-phase coils. The inverter 132 is formed of a three-phase inverter circuit, and operates so that output power of the fuel cell 110 supplied via the DC/DC converter (FDC) 115 as well as output power of the high-voltage battery 140 supplied via the DC/DC converter (BDC) 134 are converted into three-phase AC power and supplied as such to the drive motor 136. The drive motor 136 drives wheels WL with a torque corresponding to the supplied power. The inverter 132 is also enabled to output regenerative power (regenerative energy) attributed to regenerative braking of the drive motor 136 to the first high-voltage DC line HDC1.

The inverter 137 is connected to the ACP motor 138, which drives the air compressor (ACP) 139, to function as a driver for the air compressor (ACP) 139. The ACP motor 138 is formed of a synchronous motor having three-phase coils, like the drive motor 136. The inverter 137, like the inverter 132, is formed of a three-phase inverter circuit, and operates so that output power of the fuel cell 110 supplied via the DC/DC converter (FDC) 115 as well as output power of the high-voltage battery 140 supplied via the DC/DC converter (BDC) 134 are converted into three-phase AC power and supplied as such to the ACP motor 138. The ACP motor 138 drives the air compressor (ACP) 139 with a torque corresponding to the supplied power. As a result of this, air is supplied to the fuel cell 110.

In the fuel cell vehicle 18, inverters 141, 143 are connected to the second high-voltage DC line HDC2. The inverter 141 is connected to a WP motor 142, which drives the water pump (WP) 60, to function as a driver for the water pump (WP) 60. The WP motor 142 is formed of a synchronous motor having three-phase coils, like the drive motor 136. The inverter 141, like the inverter 132, is formed of a three-phase inverter circuit, and operates so that electric power supplied via the second high-voltage DC line HDC2 is converted into three-phase AC power and supplied as such to the WP motor 142. The WP motor 142 drives the water pump (WP) 60 with a torque corresponding to the supplied power. As a result of this, the fuel cell 110 is cooled.

The inverter 143 is connected to an $H_2P$ motor 144, which drives the hydrogen pump ($H_2P$) 44, to function as a driver for the hydrogen pump ($H_2P$) 44. The $H_2P$ motor 144 is formed of a synchronous motor having three-phase coils, like the drive motor 136. The inverter 143, like the inverter 132, is formed of a three-phase inverter circuit, and operates so that electric power supplied via the second high-voltage DC line HDC2 is converted into three-phase AC power and supplied as such to the $H_2P$ motor 144. The $H_2P$ motor 144 drives the hydrogen pump ($H_2P$) 44 with a torque corresponding to the supplied power. As a result of this, hydrogen is circulated in the hydrogen gas flow path.

Further connected to the second high-voltage DC line HDC2 is a DC/DC converter 145. The DC/DC converter 145 is connected to a low-voltage battery 146 via a low-voltage DC line LDC. The low-voltage battery 146 is a secondary battery of a voltage (12 V in this embodiment) lower than the high-voltage battery 140. For charging of the low-voltage battery 146, the DC/DC converter 145 steps down the voltage in the second high-voltage DC line HDC2 to a voltage that allows the low-voltage battery 146 to be charged.

Low-voltage auxiliary machines 147, which are connected to the low-voltage DC line LDC, are supplied with electric power from the low-voltage battery 146. The low-voltage auxiliary machines 147 include drive parts for driving, for example, headlights or stop lamps or other lights, blinkers, a wiper, indicators or the like and a navigation system on the instrument panel, as well as for opening and closing various types of valves provided on piping for fuel gas, oxidizing gas and cooling medium. In addition, the low-voltage auxiliary machines 147 are not limited to these ones.

The fuel cell vehicle 18 further includes an unshown controller. The controller has CPU, ROM, RAM, and input/output ports. The controller performs control of the fuel cell system, as well as control of the whole power equipment including the fuel cell system and the high-voltage battery 140 and control of individual parts of the fuel cell vehicle 18. The controller acquires output signals from sensors provided at individual parts of the fuel cell vehicle 18, and moreover acquires vehicle's driving-related information such as the degree of accelerator opening and the vehicle's speed. Then, the controller outputs drive signals to individual parts related to power generation and traveling in the fuel cell vehicle 18. More specifically, the controller outputs drive signals to the DC/DC converters 115, 134, 145, the inverters 132, 137, 141, 143, 145, the low-voltage auxiliary machines 147, and the like. The controller fulfilling the above-described functions does not need to be configured as a single-unit controller. For example, the controller may be configured as a plurality of control sections such as a control section related to operations of the fuel cell system, a control section related to traveling of the fuel cell vehicle 18, and a control section for controlling vehicle's auxiliary machines unrelated to traveling, where necessary information may be exchanged among the plurality of control sections.

Figure 10:
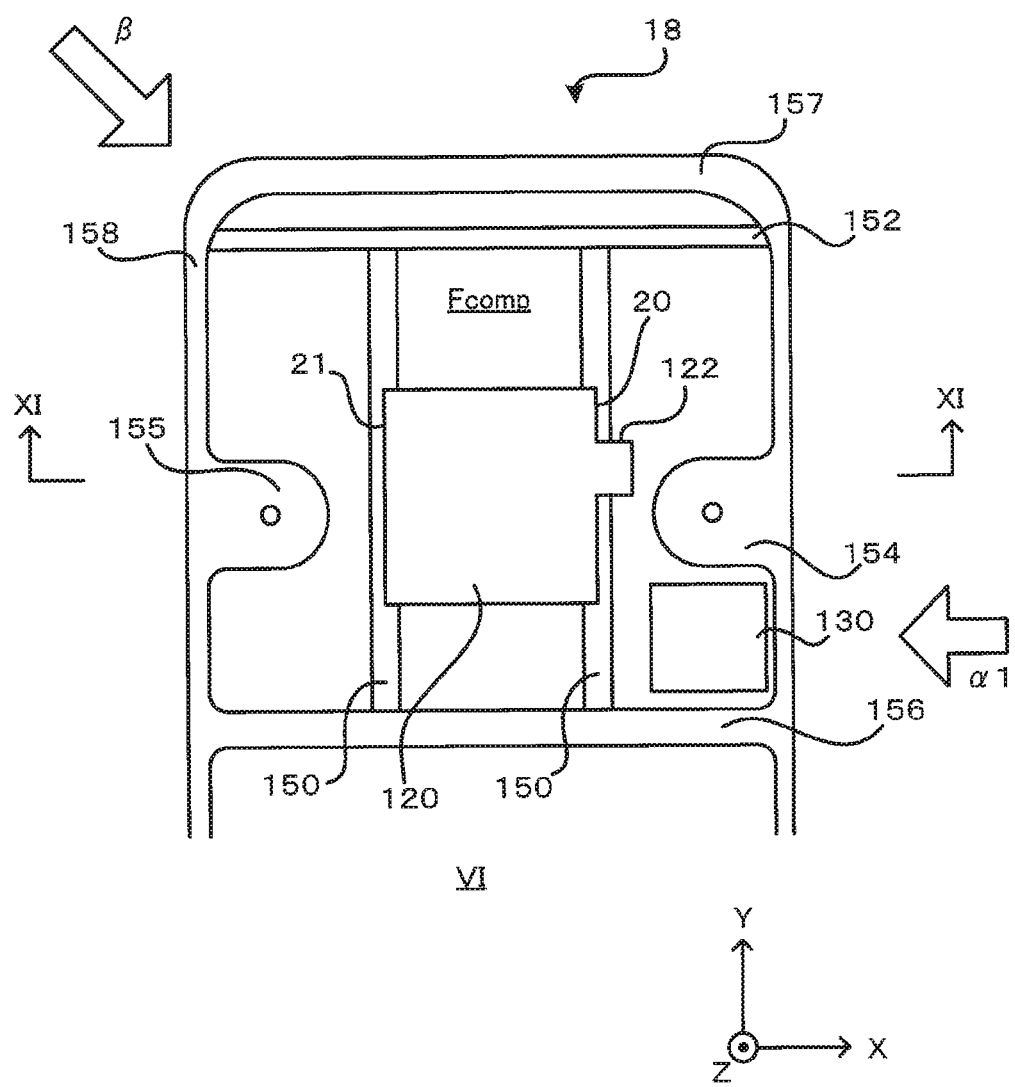
FIG. 10 is a plan view schematically showing an aspect in a front compartment.

(G-2) Placement and configuration of high-voltage unit:

FIG. 10 is a plan view schematically showing an aspect in a front compartment (Fcomp) of the fuel cell vehicle 18. The front compartment is a space provided in front part of a vehicle compartment VI in the fuel cell vehicle 18. Whereas various devices are placed in the front compartment, FIG. 10 depicts a first high-voltage unit 120 and a second high-voltage unit 130 as well as part of the structure related to a body 158 of the fuel cell vehicle 18, with the rest of the configuration omitted in depiction. In the first high-voltage unit 120, as an example, devices including high-voltage devices are housed within the high-voltage unit casing 610 of the sixth embodiment, whereas any high-voltage unit casing of the other embodiments may be used. The second high-voltage unit 130 has other devices including high-voltage devices housed within a generally rectangular parallelepiped-shaped casing.

In this embodiment, the first high-voltage unit 120 includes the DC/DC converter (FDC) 115 and the inverters 141, 143 as high-voltage devices (see FIG. 9). Also, the second high-voltage unit 130 includes the DC/DC converter (BDC) 134 and the inverters 132, 137 as high-voltage devices (see FIG. 9). The DC/DC converter (BDC) 134 and the inverters 132, 137 included in the second high-voltage unit 130 are referred to also as power control unit (PCU). The first high-voltage unit 120 has only to house at least any one high-voltage device, and the combination of devices included in the first high-voltage unit 120 and the second high-voltage unit 130 may arbitrarily be changed.

In front of the front compartment, a front bumper 157 is provided as part of the body 158. Rear part of the front compartment is partitioned from the vehicle compartment VI by a dash panel 156. Also, in the fuel cell vehicle 18, a cross member 152 extending in the vehicle's widthwise direction, and two side members 150 extending in the vehicle's front/rear direction, are provided in connection with the body 158. These two side members 150 and the cross member 152 contributes to enhancement of the strength of the vehicle's body. As shown in FIG. 10, part of the two side members 150, as well as the cross member 152, are placed so as to extend through the front compartment. Also in the front compartment, a pair of suspension towers 154, 155 are provided so as to be protruded upward. The pair of suspension towers 154, 155 are formed so as to cover front suspensions which are placed below in the vehicle body to support front wheels of the fuel cell vehicle 18, so that upper end portions of the front suspensions are thereby supported.

The first high-voltage unit 120 is placed between the pair of suspension towers 154, 155 and moreover between the dash panel 156 and the front bumper 157 in the front compartment. The first high-voltage unit 120 is also placed so as to be stacked on the fuel cell 110 housed inside the fuel cell casing (see later-described FIG. 11). Then, the stacked body in which the first high-voltage unit 120 and the fuel cell 110 are stacked together is supported via rubber bushings (not shown) on the two side members 150. The protruded portion 122 provided in the high-voltage unit casing 610 of the first high-voltage unit 120 is opposed to the suspension tower 154, which is one of the suspension towers.

The second high-voltage unit 130 is placed in a space between the suspension tower 154 on the right side of the fuel cell vehicle 18 and the dash panel 156. The second high-voltage unit 130 is supported by the suspension tower 154, the dash panel 156 and the body 158.

Figure 11:
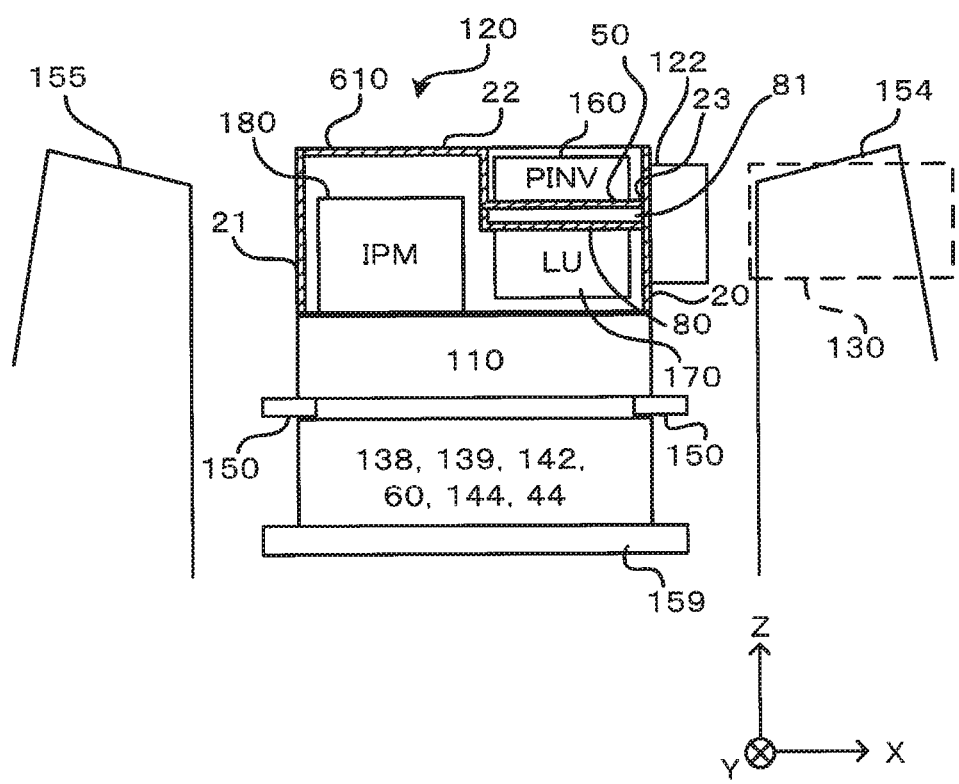
FIG. 11 is an explanatory view showing a placement inside the front compartment.

FIG. 11 is an explanatory view schematically showing a placement of individual parts inside the front compartment, in an aspect as viewed along a XI-XI plane shown in FIG. 10. As shown in FIG. 11, placed under the fuel cell 110 are the ACP motor 138, the air compressor (ACP) 139, the WP motor 142, the water pump (WP) 60, the $H_2P$ motor 144 and the hydrogen pump ($H_2P$) 44, which are fuel-cell auxiliary machines that work on power generation of the fuel cell 110.

These fuel-cell auxiliary machines are supported on a suspension member 159 connected to the body 158.

FIG. 11 also shows the second high-voltage unit 130, which is to be placed rearward of the XI-XI cross section in the traveling direction and which is depicted by broken line in a position resulting from projection onto the XI-XI cross section. The space formed between the suspension tower 154 and the dash panel 156 to have the second high-voltage unit 130 placed therein is such that its width becomes narrower and narrower along the shape of the wheels WL with increasing lowness in position. For this reason, the second high-voltage unit 130 is placed at such a position as to horizontally overlap with an upper end portion of the suspension tower 154 and the first high-voltage unit 120.

Also as shown in FIG. 11, the protruded portion 122 provided on a side face of the first high-voltage unit 120 is placed at such a position as to horizontally overlap with the suspension tower 154.

According to the fuel cell vehicle 18 of this embodiment configured as described above, since the first high-voltage unit 120 includes the high-voltage unit casing 610 of the sixth embodiment, impact resistance of the first high-voltage unit 120 can be ensured for reception of impact force having a −X direction component in the event of a collision of the fuel cell vehicle 18 or the like.

For example, when a collision load in a direction indicated by hollow arrow α1 of FIG. 10 is applied to the fuel cell vehicle 18, the first side face 20 including the protruded portion 122 collides with a structure placed on the right side such as the suspension tower 154. As a result, the first high-voltage unit 120 receives impact force in the direction indicated by hollow arrow α1. Also, when a collision load, for example, in a direction indicated by hollow arrow β of FIG. 10, i.e., from a left-oblique front is applied to the fuel cell vehicle 18, the first high-voltage unit 120 may be moved in the direction of the hollow arrow β within the front compartment. In such a case, the first high-voltage unit 120 receives impact force having a −X direction component upon a collision of, e.g., the protruded portion 122 with the suspension tower 154. The first high-voltage unit 120 is enabled to exert high impact resistance in these cases.

Figure 12:
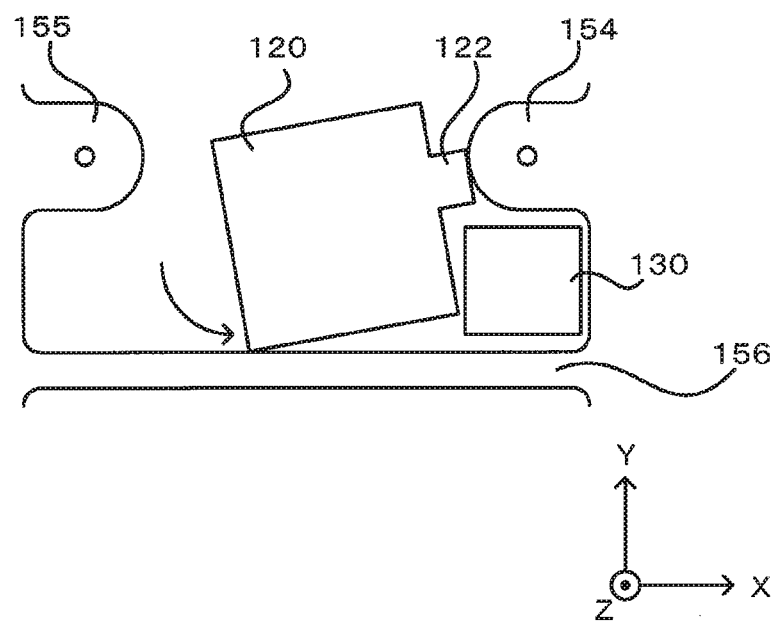
FIG. 12 is an explanatory view showing an aspect inside the front compartment subsequent to a collision.

FIG. 12 is an explanatory view showing an aspect inside the front compartment after the fuel cell vehicle 18 has received a collision load in the direction indicated by hollow arrow β (from a left-oblique front of the vehicle), as viewed from vertically upward. In such a case, while the first high-voltage unit 120 is moved toward a right-oblique rear, the protruded portion 122 of the first high-voltage unit 120 collides with the suspension tower 154, so that further movement of the first high-voltage unit 120 is suppressed. That is, using the suspension tower 154, which is an existing structure in the front compartment, in addition to the protruded portion 122 allows the first high-voltage unit 120 to be easily prevented from being further moved. Also, the first high-voltage unit 120 is rotated counterclockwise on a fulcrum that is a contact point of the protruded portion 122 with the suspension tower 154 as indicated by arrow in FIG. 12. Thereafter, a left-side rear end portion of the first high-voltage unit 120 collides with the dash panel 156, so that the first high-voltage unit 120 is stopped. As a result, as shown in FIG. 12, the first high-voltage unit 120 can be prevented from colliding with the second high-voltage unit 130. Thus, with the protruded portion 122 provided in the high-voltage unit casing 610, there can be produced an effect that upon reception of a collision load in an oblique direction, other devices placed rearward in the collision load direction are protected from damage due to the collision of the first high-voltage unit 120. The devices placed rearward of the first high-voltage unit 120 may be other high-voltage devices such as high-voltage cables, and further may be devices different from high-voltage devices, such as component parts or control devices related to supply of fuel gas.

Also, since the first high-voltage unit 120 of this embodiment includes the high-voltage unit casing 610 of the sixth embodiment as already described, devices housed in the first high-voltage unit 120 can be efficiently cooled while the first high-voltage unit 120 is prevented from upsizing. In FIG. 11, in the space 55, an inverter unit (PINV) 160 is placed so as to be in contact with the partitioning portion 50. Also, in the space 56, a reactor unit (LU) 170 is placed so as to be in contact with a horizontally extending plane of the flow path forming member 80. Further, in a left-side space that is not vertically partitioned by the partitioning portion 50, a power device module (IPM) 180 is placed. In this embodiment, adopting the above-described placement makes it possible to cool both the inverter unit (PINV) 160 and the reactor unit (LU) 170 by using the cooling medium flowing through the cooling medium flow path 81.

The inverter unit (PINV) 160 is so structured that the above-described inverter 141 and inverter 143 are integrated together. The reactor unit (LU) 170 and the power device module (IPM) 180 are included in the above-described DC/DC converter (FDC) 115. The DC/DC converter (FDC) 115 is formed of a multi-phase step-up DC/DC converter having a plurality of drive phases and smoothing capacitors. The reactor unit (LU) 170 is so structured as to include reactors of individual drive phases provided in the DC/DC converter (FDC) 115. The power device module (IPM) 180 includes switching devices and diodes of individual drive phases provided in the DC/DC converter (FDC) 115, smoothing capacitors, and cooling devices for cooling these members.

The devices shown in FIG. 11 are heat-generating devices that need to be cooled. Among these devices, the power device module (IPM) 180 is the highest in heat output and the largest in size. The inverter unit (PINV) 160 is less in heat output and smaller in size than the reactor unit (LU) 170. In this embodiment, the space 55 on the upper side of the partitioning portion 50 is made smaller than the space 56 on the lower side of the flow path forming member 80, allowing the inverter unit (PINV) 160 and the reactor unit (LU) 170 to be properly laid out. Further, the power device module (IPM) 180, which requires a special cooling device and which is formed larger in scale, is placed in a wider space formed beside the partitioning portion 50, making it possible to achieve proper placement of cooling-required devices inside the first high-voltage unit 120. Thus, in the first high-voltage unit 120, the positional relationship with the cooling medium flow path 81 as well as the vertical position of the partitioning portion 50 may be set, as required, depending on the size of devices placed therein.

As heat-generating devices to be cooled with the cooling medium flowing in the cooling medium flow path 81, devices other than the above-described ones may be placed in the space 55 and the space 56. Also, devices placed on at least one of the upper side and the lower side of the partitioning portion 50 may be heat-generating devices that do not need cooling. With such a configuration, by virtue of the arrangement that the partitioning portion 50 forms part of the wall surface of the cooling medium flow path, there can be obtained an effect that the high-voltage unit casing can be prevented from upsizing due to the provision of the cooling medium flow path.

H. Modifications:

★Modification 1:

The high-voltage unit casings of the above-described first to sixth embodiments include the connecting portions 22, 222, 322, 422. However, it is also allowable that a structure for partitioning a space in which devices are placed is further included inside the high-voltage unit casing. Given a connecting portion having a partitioning portion that is fixed to the first side face 20 at the fixing portion 23, the same effects as in the embodiment can be obtained.

★Modification 2:

In the above-described seventh embodiment, the high-voltage unit including the high-voltage unit casing is placed in the front compartment. However, other configurations may also be adopted. For example, the high-voltage unit may be placed in a space provided at a different position such as under the floor of the vehicle compartment VI. Even with the placement at a site other than in the front compartment, the same effect that the strength against the above-described impact force in the direction indicated by hollow arrow α1 is enhanced can be fulfilled.

★Modification 3:

In the above-described individual embodiments, when the high-voltage unit including the high-voltage unit casing is mounted on a vehicle, it is arranged that the +X direction is toward the right side of the vehicle, −X direction is toward the left side of the vehicle, +Y direction is toward the forward direction in the vehicle's traveling direction, and the −Y direction is toward the rearward direction in the vehicle's traveling direction. However, other arrangements may be adopted. For example, the high-voltage unit may be placed so that the X direction is toward the 'front/rear direction of the vehicle' and the Y direction is toward the 'widthwise direction of the vehicle.' That is, when the first side face 20 of the high-voltage unit casing is placed in the vehicle along a side face of the vehicle, the term, side face of the vehicle, may be either a side face of the vehicle in its widthwise direction or a side face of the vehicle in its front/rear direction. In either case, the strength of the high-voltage unit can be enhanced against the above-described impact force from a side face corresponding to the hollow arrow α1 to the high-voltage unit.

★Modification 4:

In the above-described seventh embodiment, the high-voltage unit including the high-voltage unit casing is mounted on a fuel cell vehicle. However, other configurations may be adopted. The vehicle has only to be a vehicle on which high-voltage devices are mounted, such as an electric vehicle or a hybrid vehicle, without limitation to fuel cell vehicles. Whichever type the vehicle is, using the high-voltage unit casing including the connecting portion 22 having the partitioning portion 50, which is fixed to the first side face 20 at the fixing portion 23, makes it possible to achieve the same effect that the impact resistance of the casing is enhanced enough to protect the high-voltage devices.

The disclosure is not limited to any of the embodiments and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a high-voltage unit casing to be mounted on a vehicle, the high-voltage unit casing configured to house a plurality of devices including a high-voltage device. The high-voltage unit casing comprises: a first side face to be placed along a side face of the vehicle; a second side face opposed to the first side face; and a connecting portion fixed to both the first side face and the second side face and configured to structurally connect the first side face and the second side face to each other. The connecting portion includes a partitioning portion which is fixed to the first side face at a fixing portion and which extends from the fixing portion toward the second side face, the fixing portion being located at a position separate from an upper surface and a lower surface of the high-voltage unit casing in an inner surface of the first side face. Spaces for placing at least one device included in the plurality of devices are formed on both upper side and lower side, respectively, of the partitioning portion.

According to the high-voltage unit casing of this aspect, upon reception of impact force from the first side face, the impact force can be received not only by the first side face but also by the partitioning portion of the connecting portion. Further, the impact force is transferred through the connecting portion, making it possible to receive the impact force also by the second side face. Therefore, the impact resistance can be enhanced against impact force from the first side face.

(2) In the high-voltage unit casing of the foregoing aspect, the partitioning portion may form a part of a wall surface of a flow path of a cooling medium for cooling devices on at least one of the upper side and the lower side of the partitioning portion.

According to the high-voltage unit casing of this aspect, it becomes possible to suppress increases in parts count due to the formation of a cooling medium flow path for cooling of the devices placed in the high-voltage unit casing. As a result, it becomes more easily achievable to ensure spaces for placement of the devices in the high-voltage unit casing, allowing the high-voltage unit casing to be prevented from upsizing.

(3) In the high-voltage unit casing of the foregoing aspect, the first side face may include a protruded portion protruding from an outer surface of the first side face, and the fixing portion may be provided at a position where the fixing portion overlaps with the protruded portion in the horizontally direction.

According to the high-voltage unit casing of this aspect, when the vehicle with the high-voltage unit casing mounted thereon has received impact force from external so that the high-voltage unit casing is moved in the vehicle, the protruded portion collides with adjacent another member so as to be enabled to stop the movement of the high-voltage unit casing. Thus, the protruded portion is highly likely to transfer impact force toward the first side face. Since the protruded portion is provided at a position where the fixing portion overlaps with the protruded portion in the horizontally direction, the impact resistance against impact force applied via the protruded portion can be enhanced in the high-voltage unit casing.

The disclosure may also be implemented in various modes other than devices. For example, the disclosure may be implemented in such modes as high-voltage units in which high-voltage devices are housed in the high-voltage unit casing, and vehicles on which the high-voltage unit is mounted.

What is claimed is:

1. A high-voltage unit casing to be mounted on a vehicle, the high-voltage unit casing configured to house a plurality of devices including at least one high-voltage device, the high-voltage unit casing comprising:
   a first side face to be placed along a side face of the vehicle;
   a second side face opposed to the first side face; and
   a connecting portion fixed to both the first side face and the second side face and configured to structurally connect the first side face and the second side face to each other, wherein
   the connecting portion includes a partitioning portion which is fixed to the first side face at a fixing portion and which extends from the fixing portion toward the second side face, the fixing portion being located at a position separate from an upper surface and a lower surface of the high-voltage unit casing in an inner surface of the first side face,
   spaces for placing at least one device included in the plurality of devices are formed on both upper side and lower side, respectively, of the partitioning portion,
   the first side face includes a protruded portion protruding from an outer surface of the first side face, and
   the fixing portion is provided at a position where the fixing portion overlaps with the protruded portion in the horizontal direction.

2. The high-voltage unit casing in accordance with claim 1, wherein
   the partitioning portion forms a part of a wall surface of a flow path of a cooling medium for cooling devices on at least one of the upper side and the lower side of the partitioning portion.

3. A high-voltage unit to be mounted on a vehicle, comprising:
   the high-voltage unit casing in accordance with claim 1; and
   the plurality of devices including the at least one high-voltage device to be housed in the high-voltage unit casing, wherein
   devices included in the plurality of devices are placed in both upper and lower sides of the partitioning portion.

4. A vehicle that is configured to mount the high-voltage unit in accordance with claim 3.

5. A vehicle that is configured to mount a high-voltage unit, the high-voltage unit comprising:
   the high-voltage unit casing in accordance with claim 1; and the plurality of devices including the at least one high-voltage device to be housed in the high-voltage unit casing, wherein
   devices included in the plurality of devices are placed on both upper and lower sides of the partitioning portion,
   the high-voltage unit is placed between a pair of suspension towers in a front compartment of the vehicle, the suspension towers supporting upper end portions of front suspensions supporting front wheels of the vehicle, and
   the protruded portion protrudes toward one suspension tower out of the pair of suspension towers.

6. A high-voltage unit casing to be mounted on a vehicle, the high-voltage unit casing configured to house a plurality of devices including at least one high-voltage device, the high-voltage unit casing comprising:
   a first side face to be placed along a side face of the vehicle;
   a second side face opposed to the first side face; and
   a connecting portion fixed to both the first side face and the second side face and configured to structurally connect the first side face and the second side face to each other, wherein
   the connecting portion includes a partitioning portion which is fixed to the first side face at a fixing portion and which extends from the fixing portion toward the second side face, the fixing portion being located at a position separate from an upper surface and a lower surface of the high-voltage unit casing in an inner surface of the first side face,
   the connecting portion further includes a step-gap surface portion continuing from the partitioning portion and extending vertically, and
   spaces for placing at least one device included in the plurality of devices are formed on both upper side and lower side, respectively, of the partitioning portion.

* * * * *